(12) United States Patent
Mulford et al.

(10) Patent No.: US 6,705,578 B2
(45) Date of Patent: Mar. 16, 2004

(54) APPARATUS FOR MOUNTING VISUAL RECORDING DEVICES TO HUNTING STRUCTURES AND METHOD FOR MOUNTING VISUAL RECORDING DEVICES TO HUNTING STRUCTURES

(75) Inventors: Darren K. Mulford, Fairview Heights, IL (US); Nelson Chadwick Vickrey, Wentzville, MO (US)

(73) Assignee: Extremeshot, Inc., Atlanta, MO (US)

( * ) Notice: Subject to any disclaimer, the term of this patent is extended or adjusted under 35 U.S.C. 154(b) by 0 days.

(21) Appl. No.: 10/034,287

(22) Filed: Dec. 28, 2001

(65) Prior Publication Data

US 2003/0122045 A1 Jul. 3, 2003

(51) Int. Cl.$^7$ .............................................. F16M 11/04
(52) U.S. Cl. .................................................. 248/187.1
(58) Field of Search .......................... 248/177.1, 178.1, 248/187.1, 176.3, 227.2, 286.1, 298.1, 310, 346.03, 346.06, 159, 125.8, 295.11

(56) References Cited

U.S. PATENT DOCUMENTS

| | | | | |
|---|---|---|---|---|
| 2,842,026 A | * | 1/1958 | Reese et al. | 248/178.1 X |
| 3,491,669 A | * | 1/1970 | McBride | 98/18 |
| 3,598,355 A | * | 8/1971 | English | 248/178.1 |
| 4,491,435 A | | 1/1985 | Meier | 403/55 |
| 4,530,584 A | | 7/1985 | Schmidt | 354/293 |
| 4,933,691 A | | 6/1990 | Leslie | 354/81 |
| 4,934,647 A | * | 6/1990 | Edwards | 108/10 |
| 5,173,725 A | | 12/1992 | Giles et al. | 354/81 |
| 5,318,257 A | * | 6/1994 | Tani | 248/125.1 |
| 5,540,159 A | * | 7/1996 | Anderson | 108/150 |
| 5,649,257 A | | 7/1997 | Kempka | 396/428 |
| 5,653,309 A | * | 8/1997 | Sturm | 182/187 |
| 5,664,750 A | | 9/1997 | Cohen | 248/231.71 |
| 5,669,592 A | | 9/1997 | Kearful | 248/217.4 |
| 5,737,657 A | | 4/1998 | Paddock et al. | 396/428 |
| 5,749,010 A | | 5/1998 | McCumber | 396/420 |
| 5,876,005 A | | 3/1999 | Vasconi | 248/276.1 |
| D411,220 S | | 6/1999 | Surabian | D16/242 |
| 5,927,681 A | | 7/1999 | Ovelman | 248/682 |
| 5,993,077 A | | 11/1999 | Jones | 396/428 |
| D425,540 S | | 5/2000 | Hubbell | D16/242 |
| 6,056,450 A | | 5/2000 | Walling | 396/428 |
| 6,116,485 A | * | 9/2000 | Watkins | 224/275 |
| 6,123,306 A | | 9/2000 | Jackson | 248/296.1 |
| 6,142,437 A | | 11/2000 | Wilkins, Jr. | 248/231.71 |
| 6,164,611 A | * | 12/2000 | Kuhnke | 248/178.1 |
| 6,231,017 B1 | * | 5/2001 | Watkins | 224/564 |
| 6,244,759 B1 | * | 6/2001 | Russo | 396/428 |
| 6,315,180 B1 | * | 11/2001 | Watkins | 224/275 |

* cited by examiner

Primary Examiner—Leslie A. Braun
Assistant Examiner—A. Joseph Wujciak
(74) Attorney, Agent, or Firm—Thompson Coburn LLP

(57) ABSTRACT

A mount is provided that is specifically configured to mount a visual recording device to a platform type of hunting structure, such as a deer stand, in a manner such that the mount and recording device do not interfere with a hunter's ability to conduct a hunt. A mount kit is provided that comprises a plurality of base members such that a person can attach the base members to a plurality of hunting structures and then only needs to carry the remaining portion of the mount kit to and from any such hunting structure when hunting. A method is provided for attaching a visual recording device to a plurality of hunting structures.

12 Claims, 4 Drawing Sheets

APPARATUS FOR MOUNTING VISUAL RECORDING DEVICES TO HUNTING STRUCTURES AND METHOD FOR MOUNTING VISUAL RECORDING DEVICES TO HUNTING STRUCTURES

BACKGROUND OF THE INVENTION (1) Field of the Invention

This invention pertains to the field of mounts for visual recording devices. More particularly, the invention pertains to a specialized mount and mounting kit for attaching a visual recording device to a hunting structure such as a deer stand or duck blind. The mount allows a visual recording device to be attached to a hunting structure in a manner such that the mount and the visual recording device will not interfere with a person's ability to hunt. The mount kit provides a method for attaching a visual recording device to a plurality of hunting structures without requiring entirely separate mounts or requiring complete removal and reattachment of the mount from one structure to the other.

(2) Description of the Related Art

Sport hunting is a popular pastime throughout many parts of the world and many persons participating in the sport enjoy reminiscing about particular hunts with their fellow enthusiasts. With the advent of highly portable visual recording devices such as video cassette recorders, digital video recorders, film cameras, digital cameras, and other such devices, it has become increasingly more practical for sport hunters to visually record all or portions of their hunts such that their hunts can be reviewed and shared with others as desired.

Despite numerous developments made in the visual recording device industry, several disadvantages associated with visually recording sport hunting have prevented widespread application of such recording. One disadvantage is that sport hunting generally requires the use of both hands and an unobstructed view of the target, making it impossible for an individual person to record his or her own hunt without the use of some form of mount for supporting his or her visual recording device.

Although camera mounts have existed since the conception of the camera itself, prior art mounts fail to address the specific needs of sport hunters and the factors relevant to the sports hunting industry. For example, sport hunters often travel long distances by foot during their hunts and, as such, often seek to eliminate as much unnecessary weight as possible from the equipment that they carry during such hunts. Thus, heavy or bulky mounts are often found to be impractical for use in conjunction with hunting.

It is known that specialized mounts, particularly lightweight tripods developed for use in the photography of nature and for bird watching, are lightweight and portable. However, such specialized mounts also have disadvantages to the sport hunter. First, although lightweight, such devices are generally bulky and can become a nuisance to a hunter who is already heavily burdened by equipment. Additionally, hunters often utilize hunting structures such as duck blinds, deer stands, or other such structures when positioning themselves for taking a shot at their prey. Tripods, lightweight or not, are often impractical for use in conjunction with such hunting structures due to the limited space in or around such structures and the relatively large area required when using a tripod. For example, when using a duck blind, a hunter would typically have to position a tripod outside of the blind where it would be impractical for him or her to operate or adjust the position of any visual recording device mounted thereon. Likewise, when using a hunting stand such as a deer stand, a hunter would have to position a tripod on the actual platform of the stand where space is typically extremely limited. Furthermore, due to the limited space on most hunting stands, there is a high risk that such a tripod could easily fall off the stand, thereby damaging or destroying the visual recording device and/or the tripod.

Thus, prior art mounts for visual recording devices and methods of using such mounts are typically subject to one or more of the above-mentioned disadvantages. However, the inventors of the present invention have appreciated the need for a solution to these disadvantages and have developed a mount and a mount kit that overcome such disadvantages.

SUMMARY OF THE INVENTION

The present invention overcomes the disadvantages associated with prior art devices and methods for visually recording sport hunting by providing a mount, a mount kit, and a method, all specifically adapted for use in connection with visually recording sport hunts. The mount of the present invention is specifically configured to mount a visual recording device to a platform type of hunting structure, such as a deer stand, in a manner such that the mount and recording device do not interfere with a hunter's ability to conduct a hunt. The mount kit of the invention pertains to a mount having a plurality of base members such that a hunter can attach the base members to a plurality of hunting structures and then only needs to carry the remaining portion of the mount kit to and from any such hunting structure when hunting. The method of the invention pertains to steps involved in attaching a visual recording device to a plurality of hunting structures.

In general, the mount of the invention comprises a base member, an intermediate member, and a pan-and-tilt mechanism. The base member has a first end portion that is adapted and configured to enable the base member to be attached to a platform of the type often found on hunting structures such as deer stands. The base member is dimensioned and adapted such that a second end portion of the base member is positioned cantilevered from the platform where it is offset from the edge of the platform, when the base member is attached to the platform. The intermediate member has opposite first and second ends. The first end of the intermediate member is attached to the second end portion of the base member in a manner such that the second end of the intermediate member is positioned directly over the first end of the intermediate member when the base member is attached to the platform. The pan-and-tilt mechanism is attached to the second end of the intermediate member for supporting a visual recording device thereon.

The mounting kit of the invention generally comprises at least two base members, an intermediate member, and a pan-and-tilt mechanism. Each of the base members is adapted and configured to rigidly secure the base member to a hunting structure. The intermediate member has opposite first and second ends. The first end of the intermediate member is releasably and rigidly attachable to each of the base members in a manner such that the second end of the intermediate member is cantilevered from the respective base member when the intermediate member is attached thereto. The pan-and-tilt mechanism is attached to the second end of the intermediate member for supporting a visual recording device thereon.

The method of the invention generally comprises providing first and second base members, mounting the first base member to one of a plurality of hunting structures, mounting the second base member to another of the plurality of hunting structures, providing an intermediate member, a hand operable pan-and-tilt mechanism, and a visual recording device, attaching the intermediate member, the pan-and-tilt mechanism, and the visual recording device to the one of the plurality of hunting structures by attaching the first end of the intermediate member to the first base member. The method further comprises removing the intermediate member, the pan-and-tilt mechanism, and the visual recording device from the first base member, and attaching them to the other of the plurality of hunting structures by attaching the first end of the intermediate member to the second base member.

While the principle advantages and features of the invention have been described above, a more complete and thorough understanding of the invention may be attained by referring to the drawings and the detailed description of the preferred embodiments which follow.

BRIEF DESCRIPTION OF THE DRAWINGS

Reference characters in the written specification indicate corresponding parts throughout the several views of the drawings.

DETAILED DESCRIPTION OF THE INVENTION

Figure 1:
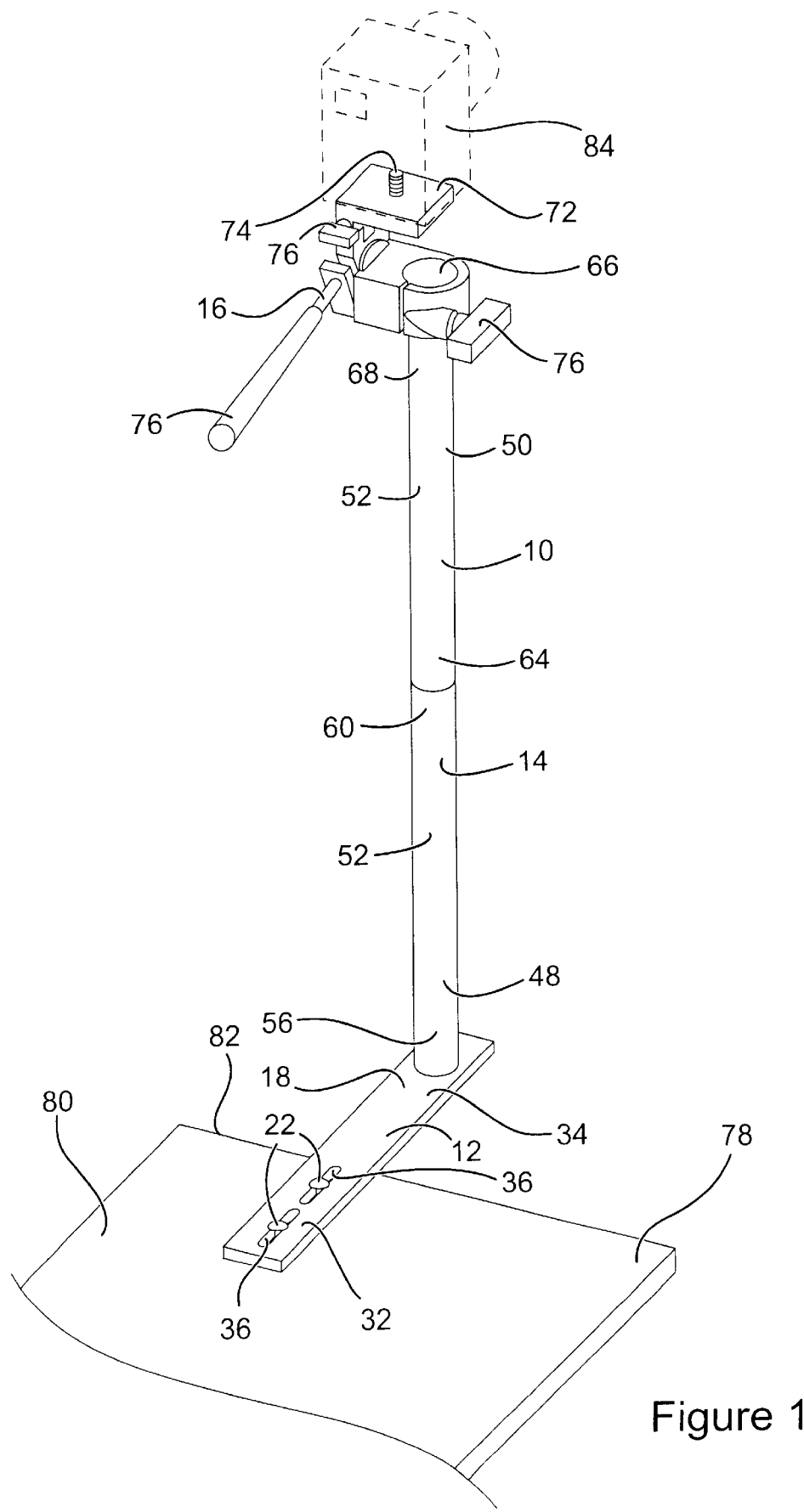
FIG. 1 is a perspective view of a first embodiment of the invention shown mounted on a platform, such as would be found on a deer stand, and a schematic representation of a visual recording device attached thereto.

A first embodiment of a mount in accordance with the invention is specifically configured for use in connection with platform type hunting structures such as deer stands and is shown assembled to such a platform in FIG. 1. In general, the first embodiment of the mount 10 comprises a base member 12, an intermediate member 14, and a pan-and-tilt mechanism 16.

Figure 2:
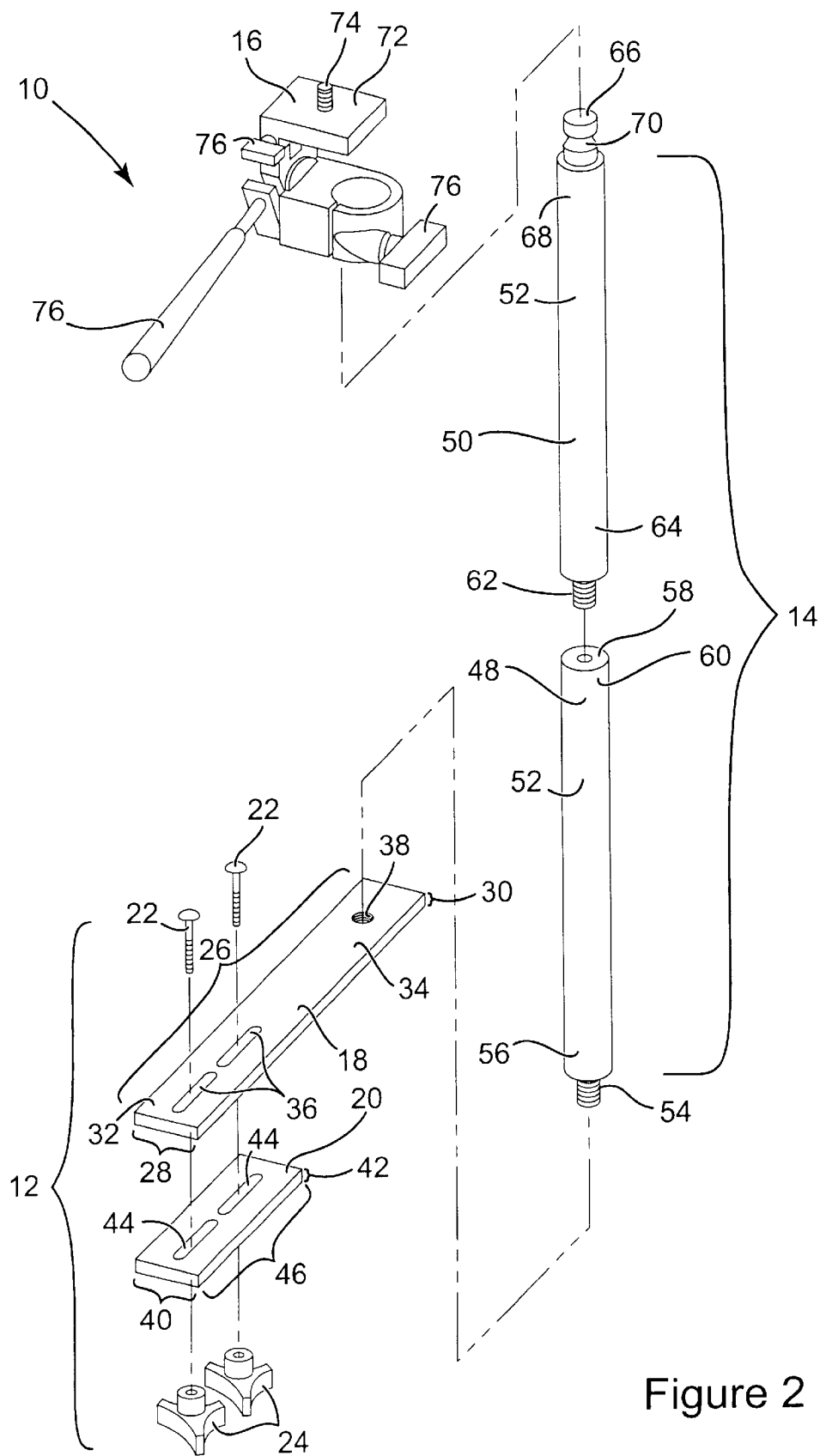
FIG. 2 is an exploded assembly view of the mount shown in FIG. 1.

As shown in FIG. 2, the base member 12 of the mount 10 comprises a main base plate 18, a secondary base plate 20, a pair of bolts 22, and a pair of clamping knobs 24. The main base plate 18 is preferably formed as a generally rectangular shaped piece of plate metal, such as steel or aluminum, and has a longitudinal length 26, transverse width 28, and a thickness 30. The longitudinal length 26 of the main base plate 18 defines longitudinally opposite first and second end portions 32,34 of the main base plate. The first end portion 32 of the main base plate 18 has a pair of slots 36 that each extend through the thickness 30 of the main base plate. The slots 36 are each centered relative to the width 28 of the main base plate 18 and each extend longitudinally relative thereto. The second end portion 34 of the main base plate 18 has a through hole 38 that is centrally positioned relative to the width 28 of the main base plate. The through hole 38 is provided with a threaded fitting that is preferably formed by welding a weld nut (not shown) to the bottom surface of the main base plate 18. The secondary base plate 20 of the base member 12, like the main base plate 18, is also formed as a rectangular shaped piece of metal and has a width 40 and a thickness 42 equal to that of the main base plate. Likewise, the secondary base plate 20 has a pair of slots 44 that extend through the thickness 42 of the secondary base plate and that are aligned with and dimensioned similar to the slots 36 of the main base plate 18. However, the secondary base plate 20 has a longitudinal length 46 that is substantially shorter than that of the main base plate 18. The bolts 22 of the base member 12 are preferably square neck carriage bolts having shafts adapted to pass through the slots 36 of the main and secondary base plates 18,20 and to cooperate with the clamping knobs 24 of the base member.

The intermediate member 14 of the first embodiment of the mount 10 comprises first and second cylindrical pole sections 48,50 as shown clearly in FIG. 2. Each of the first and second pole sections 48,50 comprises a tubular main body 52 that is preferably formed of metal such as steel or aluminum and that has a longitudinal length of approximately one foot and a diameter of approximately one inch. The first pole section 48 has a threaded rod fitting 54 that is preferably welded to a longitudinal first end 56 of its main body 52. A threaded insert fitting 58 having female threads is preferably welded to the main body 52 of the first pole section 48 at its longitudinally opposite second end 60. Like the first pole section 48, the second pole section 50 has a threaded rod fitting 62 welded to a longitudinal first end 64 of the second pole section. However, unlike the first pole section 48, a generally cylindrical fitting 66 is attached to the longitudinally opposite second end 68 of the second pole section 50. The cylindrical fitting 66 has a diameter slightly less than that of the main body 52 of the second pole section 50 and has a semicircular annular groove 70 formed therein. The cylindrical fitting 66 is specifically configured and adapted for releasably securing the pan-and-tilt mechanism 16 to the intermediate member 14 in a manner that allows the pan-and tilt mechanism to be selectively pivoted thereabout. However, it should be understood that numerous variations of pan-and-tilt mechanisms exist and that various fittings are known for such mechanisms. Thus, it should be appreciated that alternative fittings could be attached to or formed on the intermediate member 14 of the mount 10 in place of the cylindrical fitting 66 so as to attach various other pan-and-tilt mechanisms thereto.

The pan-and-tilt mechanism 16 of the first embodiment of the mount 10 is a standard pan-and-tilt camera mount of the type commonly used on tripods and is preferably formed mainly of plastic. The pan-and-tilt mechanism is commercially available as a single unit from numerous suppliers throughout the world. Because such pan-and-tilt mechanisms are widely available and are sold as single units, details of how such mechanisms are formed and operate is not discussed in this application. Nonetheless, U.S. Pat. No. 4,457,610 issued on Jul. 3, 1984 discloses a pan-and-tilt mechanism invented by Michio Kawazoe and the disclosure therein is hereby incorporated in its entirety by reference. It should be appreciated that such mechanisms, as shown in the drawing figures, typically comprise a mounting plate 72 having a standard threaded fitting 74 for attaching a visual recording device thereto. Additionally, the pan-and-tilt mechanism 16 of the first embodiment of the mount 10 of the invention has a plurality of control knobs 76 for adjusting the pan angle, the tilt angle, and a third pivot angle of the mounting plate 72 relative to the cylindrical fitting 66 of the intermediate member 14 to which the pan-and-tilt mechanism is attached. Other various pan-and-tilt mechanisms may utilize means such as a ball-and-socket connection for adjusting the various angles of their respective mounting plates.

As described above, the first embodiment of the mount 10 is specifically configured and adapted to be assembled and mounted to a platform of a hunting structure, such as a platform of a deer stand. The assembly of the mount 10 is preferably achieved by first placing the main base plate 18 of the base member 12 against the top surface 78 of such a platform 80, as shown in FIG. 1. This is preferably done in a manner such that the length 26 and width 28 of the main base plate 18 is parallel to the top surface 78 of the platform 80 and such that the second end portion 34 of the main base plate is cantilevered from the platform where it is offset from the edge 82 of the platform. Holes (not shown) are then drilled through the platform 80 where they will be aligned with the slots 44 of the main base plate 18. The slots 36 of the main base plate 18 allow some leeway for the drilling of such holes. After the holes have been created, the bolts 22 of the base member 12 are passed through the slots 36 of the main base plate 18 and through the holes in the platform 80. The secondary base plate 20 of the base member 12 is then positioned against the underside of the platform 80 with the bolts 22 of the base member extending through the slots 44 of the secondary base plate. The clamping knobs 24 of the base member 12 are then threadably engaged with the bolts 22 from beneath the platform 80 where they are then hand tightened against the secondary base plate 20 to securely clamp the base member to the platform. It should be appreciated that, because the bolts 22 are square neck carriage bolts, the bolts are prevented from rotating within the slots 36 of the main base plate 18 as the clamping knobs 24 are tightened against the secondary base plate 20. It should also be appreciated that the base member 12 could alternatively be attached to the platform 80 with the secondary base plate 20 positioned against the top surface 78 of the platform and the main base plate 18 against the underside of the platform.

With the base member 12 of the first embodiment of the mount 10 securely clamped to the platform 80, the intermediate member 14 is then assembled by threadably engaging the threaded rod fitting 62 of the second pole section 50 with the threaded insert fitting 58 of the first pole section 48. The intermediate member 14 is then attached to the base member 12 by threadably engaging the threaded rod fitting 54 of the first pole section 48 with the threaded through hole 38 of the main base plate 18 of the base member. Finally, the assembly of the mount 10 to the platform 80 is completed by attaching the pan-and-tilt mechanism 16 to the cylindrical fitting 66 of the second pole section 50 of the intermediate member 14 in a standard manner for such a pan-and-tilt mechanism.

Once fully assembled and attached to the platform 80, a visual recording device 84 can be attached the mounting plate 72 of the pan-and-tilt mechanism 16, as shown schematically in FIG. 1. It should be appreciated that the mount 10 positions any such visual recording device 84 offset from the edge 82 of the platform 80 where it will not occupy the space above the top surface 78 of the platform, but also where it can be grasp by a person supported on the platform. This prevents the mount 10 and visual recording device 84 from impinging upon the limited space of the platform 80. It should also be appreciated that the mount 10 positions any such visual recording device 84 vertically above the platform 80 by preferably a distance of around two and a half feet where the pan-and-tilt mechanism 16 and the visual recording device can be operated by a person kneeling or squatting on the platform, but where it will not occupy the space above the person's waist when he or she is standing. This vertical positioning allows a person to easily adjust the orientation of the visual recording device 84 via the pan-and-tilt mechanism 16 of the mount 10 while also preventing the mount and the visual recording device from interfering with the person's line-of-sight to his or her intended prey and with his or her use of a weapon. Finally, it should be appreciated that the thickness 30 of the main base plate 18 of the base member 12 is relatively small compared to its length 26 and width 28 to allow the base member to be relatively flush with the top surface 80 of the platform 72 when attached thereto. This aspect reduces the risk of the base member 12 being tripped over by a person standing on the platform and allows such a person to partially stand on the base member if needed.

Figure 3:
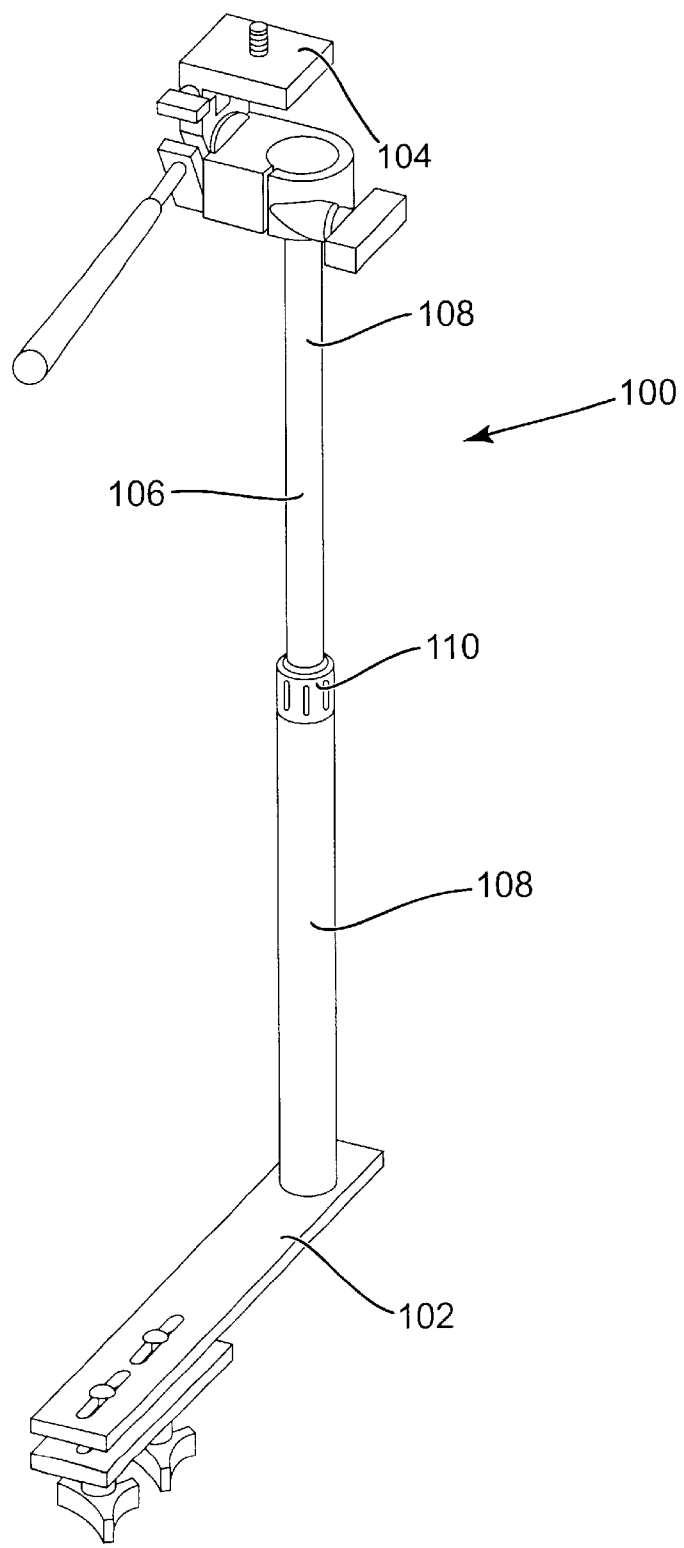
FIG. 3 is a perspective view of a second embodiment of the invention having a telescoping intermediate member.

A second embodiment of a mount 100 is shown in FIG. 3, and comprises a base member 102 and a pan-and-tilt mechanism 104 that is identical to the first embodiment of the mount 10 shown in FIGS. 1 and 2, and can be assembled to a platform of a hunting structure in a similar manner. However, the mount 100 of the second embodiment comprises an intermediate member 106 that differs from that of the mount 10 of the first embodiment. Rather than comprising a plurality of pole sections, the intermediate member 106 of the mount 100 of the second embodiment comprises a plurality of tubular telescoping sections 108 that are slidably engaged with each other in a manner such that one or more of the telescoping sections can be retracted and extended into the other telescoping section(s) to allow the longitudinal length of the intermediate member to be adjusted. Such telescoping mechanisms are well known in the field of camera mounts and, as such, the details of the specific configuration and manner of operation of the telescoping sections are not discussed in this application. However, it should be appreciated that most such telescoping mechanisms are usually provided with some form of locking nut 110 or locking clamp that is capable of locking the telescoping sections in a particular position relative to each other. It should also be appreciated that the base 112 of the intermediate member 106 and the top 114 of the intermediate member are provided with fittings (not shown) similar to that of the intermediate member 14 of the mount 10 of the first embodiment for attachment to the base member 102 and the pan-and-tilt mechanism 104 in a manner similar to that of the mount 10 of the first embodiment as discussed above. Although the telescoping nature of the intermediate member 106 of the mount 100 of the second embodiment does allow its length to be adjusted, it has a fully extended length equal to the intermediate member 14 of the mount 10 of the first embodiment and it is intended to be used in its fully extended position when attached to a hunting structure. However, the telescoping nature of the intermediate member 106 of the mount 100 of the second embodiment allows the intermediate member to be made more compact when transporting the intermediate member to and from a hunting structure.

Figure 4:
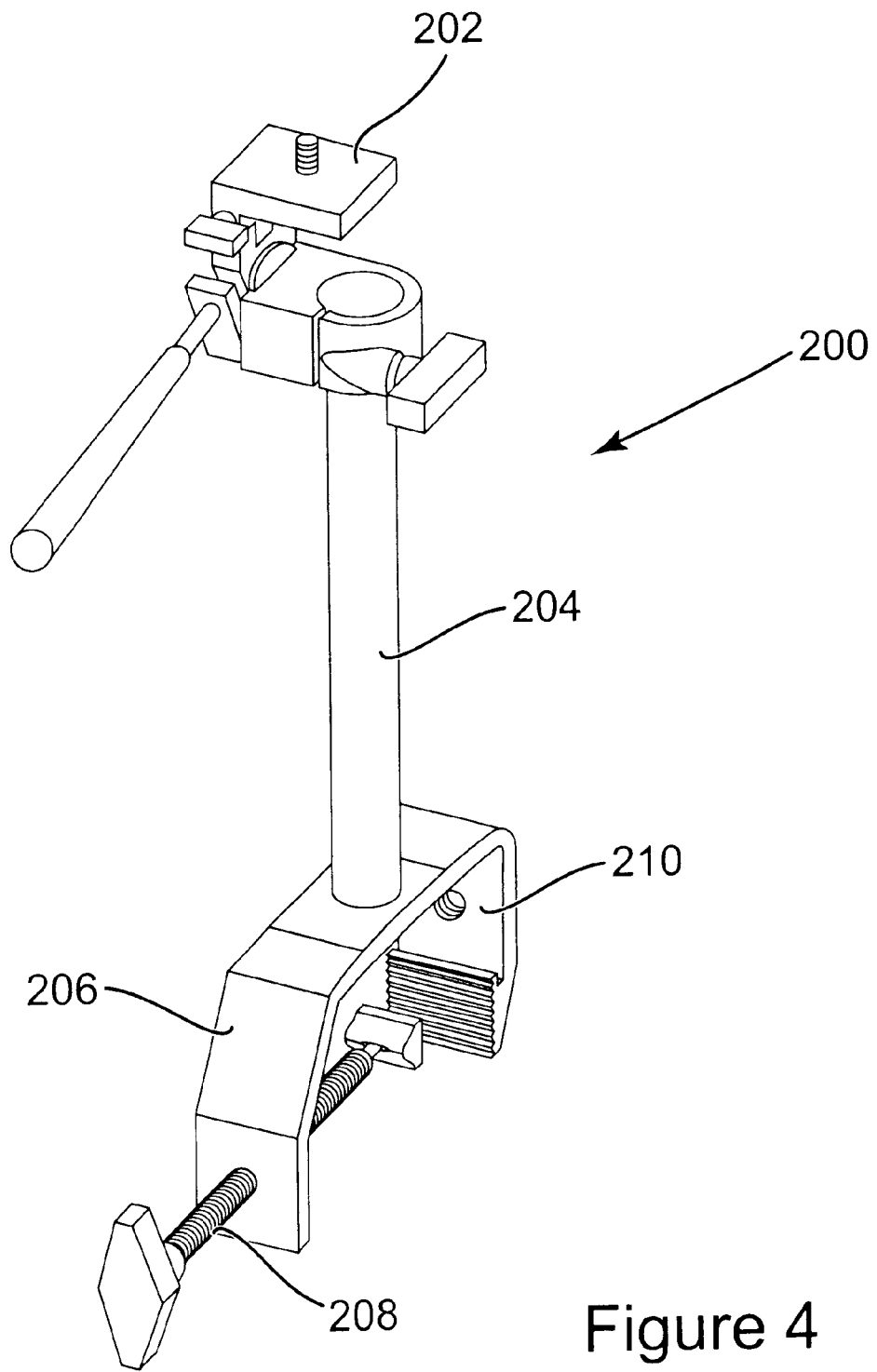
FIG. 4 is a perspective view of a third embodiment of a mount having a C-clamp base member.

A third embodiment of a mount 200 is shown in FIG. 4. The mount 200 of the third embodiment comprises a pan-and-tilt mechanism 202 similar to that of the mounts 10,100 of the first and second embodiments and a pole section 204 that is identical to the second pole section 50 of the mount of the first embodiment. Alternatively, the mount 200 of the third embodiment could utilize a telescoping intermediate member similar to that of the mount 100 of the second embodiment described above. Unlike the mounts 10,100 of the first and second embodiments, the mount 200 of the third embodiment comprises a C-clamp base member 206. The C-clamp base member 206 is essentially a standard C-clamp of the type commonly available and comprises a first threaded fitting (not shown) into which the pole section 204 is shown threadably attached. When the pole section 204 is attached to this first threaded fitting of the C-clamp base member 206, the pole section extends perpendicular from the axis of the threaded press 208 of the C-clamp base member. The C-clamp base member 206 also comprises a second threaded fitting 210 that is identical to the first threaded fitting but is oriented such that the pole section 204 can be alternatively attached to the second threaded fitting in a manner such that the pole section extends parallel to the axis of the threaded press 208 of the C-clamp base member.

Configured as described above, the mount 200 of the third embodiment is particularly adapted for use in conjunction with hunting structures, such as duck blinds, that have a vertically oriented wall. When the pole section 204 is attached to the first threaded fitting as shown in FIG. 4, the second pole section will extend vertically from such a vertical wall when the mount 200 is attached thereto. Alternatively, the pole section 204 can be attached to the second threaded fitting 210 where it will extend horizontally from such a vertical wall.

Having described several alternative embodiments of mounts, the mounting kit of the invention will now be described. The mounting kit comprises at least two base members, an intermediate member, and a pan-and tilt mechanism. Each of the base members of the mount kit is preferably of the type used in conjunction with either the mount 10 of the first embodiment or the mount 200 of the third embodiment and the base members need not be identical to each other. The intermediate member is preferably of the type used in conjunction with the mounts of either the first, second, or third embodiments. Finally, the pan-and-tilt mechanism of the mounting kit is preferably a standard commercially available pan-and-tilt mechanism of the type used in conjunction with the alternative embodiments of the mounts described above.

The method of the invention for mounting a visual recording device to a plurality of hunting structures comprises several steps. One of the steps is providing first and second base members with each of the base members being mountable to a hunting structure. The hunting structure is preferably a deer stand or duck blind but could also be any form of generally rigid structure used in conjunction with sport hunting. Each of the base members is preferably a base member of the type utilized in conjunction with any of the embodiments of the mount of the invention as described above but could also be any form of base member such as merely a member that is directly boltable or otherwise securable to a hunting structure or any other suitable base member of the type known in the art.

The method also comprises the steps of mounting the first base member to one of a plurality of hunting structures in a manner such that the first base member is rigidly secured to the hunting structure and mounting the second base member to another of the plurality of hunting structures in a manner such that the second base member is rigidly secured to the other hunting structure. Because each of the base members is preferably a base member of the type described above as utilized in conjunction with any of the embodiments of mount of the invention, the actual sub-steps of mounting each the base members to such hunting structures is preferably the same as has been described above in the discussion of the assembly of the various alternative mounts of the invention. However, it should be appreciate that various alternative mounts may require various alternative sub-steps as are known in the art.

The method further comprises the step of providing an intermediate member, a hand operable pan-and-tilt mechanism, and a visual recording device. The intermediate member is provided in a manner such that it has longitudinally opposite first and second ends with the first end of the intermediate member being releasably rigidly attachable to each of the first and second base members in a manner such that the second end of the intermediate member will be cantilevered from the respective base member when the intermediate member is attached thereto. The pan-and-tilt mechanism is provided in a manner such that it is attached to the second end of the intermediate member and to the visual recording device and supports the visual recording device from the intermediate member. Like the base members, the intermediate member and the hand operable pan-and-tilt mechanism that are provided are preferably of the type utilized in conjunction with the alternative embodiments of the mount of the invention as discussed above but could also be any type of intermediate member or pan-and-tilt mechanism known in the art. Likewise, the visual recording device could be any form of visual recording device such as a digital camera, a film camera, a camcorder, a digital video recorder, or other suitable devices capable or recording still frame or live action visual events.

The method also comprises the step of attaching the intermediate member, the pan-and-tilt mechanism, and the visual recording device to the one of the plurality of hunting structures by attaching the first end of the intermediate member to the first base member and the step of subsequently removing the intermediate member, the pan-and-tilt mechanism, and the visual recording device from the first base member. Finally, the method also comprises attaching the intermediate member, the pan-and-tilt mechanism, and the visual recording device to the other of the plurality of hunting structures by attaching the first end of the intermediate member to the second base member, after such items have been removed from the first base member. The base members are preferably left attached to the hunting structures.

By performing the method of the invention, a person is able to mount the visual recording device to a plurality of hunting structures without having to carry an entire mount from one such structure to the next or without having to purchase a plurality of entirely separate mounts for each such structure. Because the intermediate member and the pan-and tilt mechanism can be provided such that it is compact, lightweight, and inexpensive, the method of the invention provides an economical means for hunters to visually record hunts and does so without significantly encumbering such hunters as they travel to and from their hunting sites While the present invention has been described in reference to specific embodiments, in light of the foregoing, it should be understood that all matter contained in the description or shown in the accompanying drawings is intended to be interpreted as illustrative and not in a limiting sense and that various modifications and variations of the invention may be constructed without departing from the scope of the invention described in the following claims. Furthermore, it should be understood that when introducing elements of the present invention in the claims or in the above description of the preferred embodiment(s) of the invention, the terms "comprising," "including," and "having" are intended to be inclusive and mean that there may be additional elements other than the listed elements. Additionally, it should be appreciated that, in some claims, it is possible that several of the elements could be provided in or incorporated into only a single piece of structure and need not necessarily be separable structural elements.

What is claimed:

1. A mount for connecting a visual recording device to a platform, the mount comprising:

a base member having a longitudinal length, a lateral width, and longitudinally opposite first and second end portions, the first end portion being adapted and configured to enable the base member to be attached to a platform, the base member being configured and adapted such that the second end portion of the base member is cantilevered from the platform with the second end portion of the base member being off set from an edge of the platform when the base member is attached to the platform, the second end portion of the base member comprising a threaded fitting;

an intermediate member having a length with opposite first and second ends, the first end of the intermediate member being attached to the second end portion of the base member in a manner such that the intermediate member positions the second end of the intermediate member directly over the second end portion of the base member, when the base member is attached to the platform, the intermediate member comprising first and second cylindrical pole sections, the first pole section have axially opposite ends with each end having a threaded fitting, the second pole section having axially opposite ends with at least one of its ends having a threaded fitting, the threaded fitting of one of the ends of the first pole section being attached to the threaded fitting of the second end portion of the base member and the threaded fitting of the other end of the first pole section being attached to the threaded fitting of the second pole section, the threaded engagements allowing the intermediate member to be separable from the base member without the use of tools and allowing the first and second pole sections to be separable from each other without the use of tools; and a hand operable pan-and-tilt mechanism attached to the second end of the intermediate member, the pan-and-tilt mechanism being configured and adapted to attach to and support a visual recording device in a manner such that the visual recording device can be oriented in various positions relative to the platform when the base member is attached to the platform and the pan-and-tilt mechanism is attached to the visual recording device.

2. The mount of claim 1, wherein:

the base member comprises a main base plate, a secondary base plate, and a pair of bolts, each of the bolts being configured and adapted to bias the main base plate and the secondary base plate toward each other in a manner to enable the base member to be clamped to a platform with the platform positioned between the main base plate and the secondary base plate.

3. A mounting kit for supporting a visual recording device, the mounting kit comprising:

at least two base members, each of the base members being adapted and configured to enable the base member to be rigidly secured to a hunting structure independently of the other of the base members, each of the base members comprising a threaded fitting;

an intermediate member having a length with opposite first and second ends, the first end of the intermediate end member being releasably and rigidly attachable to each of the base members with the second end of the intermediate member being cantilevered from the respective base member when the intermediate member is attached to the respective base member, the intermediate member comprising first and second cylindrical pole sections, the first pole section having axially opposite ends that each have a threaded fitting, the second pole section having axially opposite ends with at least one of its ends having a threaded fitting, the threaded fitting of one of the ends of the first pole section being attachable to the threaded fitting of each of the base members and the threaded fitting of the other end of the first pole section being attached to the threaded fitting of the second pole section, the threaded fittings allowing the intermediate member to be selectively attachable to either of the base members without the use of tools and allowing the first and second pole sections to be separated to allow for disassembly of the intermediate member without the use of tools; and a hand operable pan-and-tilt mechanism attached to the second end of the intermediate member, the pan-and-tilt mechanism being configured and adapted to attach to and support a visual recording device in a manner such that the visual recording device can be oriented in various positions relative to the intermediate member when the pan-and-tilt mechanism is attached to the visual recording device.

4. A method of mounting a visual recording device to a plurality of hunting structures, the method comprising:

providing first and second base members, each of the base members being mountable to a hunting structure;

mounting the first base member to one of a plurality of hunting structures in a manner such that the first base member is rigidly secured to the one hunting structure;

mounting the second base member to another of the plurality of hunting structures in a manner such that the second base member is rigidly secured to the other hunting structure;

providing an intermediate member, a hand operable pan-and-tilt mechanism, and a visual recording device, the intermediate member having a length with opposite first and second ends, the first end of the intermediate member being releasably and rigidly attachable to each of the first and second base members in a manner such that the second end of the intermediate member will be cantilevered from the respective base member when the intermediate member is attached thereto, the pan-and-tilt mechanism being attached to the second end of the intermediate member and to the visual recording device in a manner such that the pan-and-tilt mechanism supports the visual recording device from the intermediate member and the visual recording device can be oriented in various positions relative to the intermediate member;

attaching the intermediate member, the pan-and-tilt mechanism, and the visual recording device to the one of the plurality of hunting structures by attaching the first end of the intermediate member to the first base member;

removing the intermediate member, the pan-and-tilt mechanism, and the visual recording device from the first base member; and attaching the intermediate member, the pan-and-tilt mechanism, and the visual recording device to the other of the plurality of hunting structures by attaching the first end of the intermediate member to the second base member.

5. The method of claim 4, wherein the hand operable pan-and-tilt mechanism, the visual recording device, and the intermediate member are releasably and selectively attachable to each other and wherein the step of attaching the intermediate member, the pan-and-tilt mechanism, and the visual recording device to the first base member further comprises releasably attaching the pan-and-tilt mechanism to the intermediate member and releasably attaching the visual recording device to the pan-and-tilt mechanism.

6. The method of claim 4, wherein the one of the plurality of hunting structures is a hunting platform and the first base member has a longitudinal length with opposite first and second end portions, the step of mounting the first base member to the platform further comprising mounting the first base member to the platform in a manner such that the second end portion of the first base member is positioned cantilevered from the platform with the second end portion of the base member being offset from a edge of the platform, the step of attaching the intermediate member, the pan-and-tilt mechanism, and the visual recording device to the first base member further comprising attaching the intermediate member to the first base member in a manner such that the second end of the intermediate member is positioned directly over the second end portion of the first base member.

7. The method of claim 6, wherein the step of attaching the intermediate member, the pan-and-tilt mechanism, and the visual recording device to the first base member further comprises attaching the intermediate member to the first base member in a manner such that the intermediate member and the pan-and-tilt mechanism are horizontally offset from the edge of the platform where the intermediate member and the pan-and-tilt mechanism will not occupy space directly above the platform, but where the pan-and-tilt mechanism can be grasped and hand operated by a person standing on the platform.

8. The method of claim 7, is wherein the step of attaching the intermediate member, the pan-and-tilt mechanism, and the visual recording device to the first base member further comprises attaching the intermediate member to the first base member in a manner such that the pan-and-tilt mechanism will be vertically positioned above a top surface of the platform by a distance of between eighteen and thirty-six inches such that the pan-and-tilt mechanism and the visual recording device mounted to the intermediate member can be grasped and manually oriented relative to the platform by a person kneeling on the platform, but where the pan-and-tilt mechanism and the visual recording device will not occupy space above the person's waist when the person is standing on the platform.

9. The method of claim 4, wherein the step of attaching the intermediate member, the pan-and-tilt mechanism, and the visual recording device to the one of the plurality of hunting structures by attaching the first end of the intermediate member to the first base member occurs with the second base member being unconnected to the intermediate member, and wherein the step of attaching the intermediate member, the pan-and-tilt mechanism, and the visual recording device to the other of the plurality of hunting structures by attaching the first end of the intermediate member to the second base member occurs with the first base member being unconnected to the intermediate member.

10. The method of claim 4, wherein the step of attaching the intermediate member, the pan-and-tilt mechanism, and the visual recording device to the one of the plurality of hunting structures by attaching the first end of the intermediate member to the first base member occurs with the second base member being connected to the other of the plurality of hunting structures, and wherein the step of attaching the intermediate member, the pan-and-tilt mechanism, and the visual recording device to the other of the plurality of hunting structures by attaching the first end of the intermediate member to the second base member occurs with the first base member being connected to the one of the plurality of hunting structures.

11. A method of mounting a visual recording device to a plurality of hunting structures, the method comprising:

providing first and second base members, each of the base members being mountable to a hunting structure, each of the first and second base members comprising a threaded fitting;

mounting the first base member to one of a plurality of hunting structures in a manner such that the first base member is rigidly secured to the one hunting structure;

mounting the second base member to another of the plurality of hunting structures in a manner such that the second base member is rigidly secured to the other hunting structure;

providing an intermediate member, a hand operable pan-and-tilt mechanism, and a visual recording device, the intermediate member having a length with opposite first and second ends, the intermediate member comprises first and second cylindrical pole sections, the first pole section having axially opposite ends that each have a threaded fitting, the second pole section having axially opposite ends with at least one of its ends having a threaded fitting, the first end of the intermediate member being releasably and rigidly attachable to each of the first and second base members in a manner such that the second end of the intermediate member will be cantilevered from the respective base member when the intermediate member is attached thereto, the pan-and-tilt mechanism being attached to the second end of the intermediate member and to the visual recording device in a manner such that the pan-and-tilt mechanism supports the visual recording device from the intermediate member and the visual recording device can be oriented in various positions relative to the intermediate member;

attaching the intermediate member, the pan-and-tilt mechanism, and the visual recording device to the one of the plurality of hunting structures by attaching the threaded fitting of one of the ends of the first pole section to the threaded fitting of the first base member and attaching the threaded fitting of the other of the axial ends of the first pole section to the threaded fitting of the second pole section;

removing the intermediate member, the pan-and-tilt mechanism, and the visual recording device from the first base member; and attaching the intermediate member, the pan-and-tilt mechanism, and the visual recording device to the other of the plurality of hunting structures by attaching the threaded fitting of one of the ends of the first pole section to the threaded fitting of the second base member and attaching the threaded fitting of the other of the axial ends of the first pole section to the threaded fitting of the second pole section.

12. A mounting kit for supporting a visual recording device, the mounting kit comprising:

at least two base members, each of the base members being adapted and configured to enable the base member to be rigidly secured to a hunting structure independently of the other of the base members, each of the base members being similar in size and shape to the other of the base members;

an intermediate member having a length with opposite first and second ends, the first end of the intermediate member being releasably and rigidly attachable to each of the base members with the second end of the intermediate member being cantilevered from the respective base member when the intermediate member is attached to the respective base member; and a hand operable pan-and-tilt mechanism attached to the second end of the intermediate member, the pan-and-tilt mechanism being configured and adapted to attach to and support a visual recording device in a manner such that the visual recording device can be oriented in various positions relative to the intermediate member when the pan-and-tilt mechanism is attached to the visual recording device.

* * * * *